United States Patent [19]

Kepler et al.

[11] Patent Number: 4,785,956
[45] Date of Patent: Nov. 22, 1988

[54] TANK FITTING FOR A FILAMENT-WOUND VESSEL

[75] Inventors: Arthur M. Kepler, Atwater; Edward T. LeBreton, Mentor; Clyde W. Groves, Madison, all of Ohio

[73] Assignee: Essef Industries, Inc., Mentor, Ohio

[21] Appl. No.: 410,417

[22] Filed: Aug. 23, 1982

[51] Int. Cl.$^4$ ............................................. B65D 25/14
[52] U.S. Cl. ........................................ 220/3; 138/30; 220/414
[58] Field of Search ...................... 138/30; 156/272.4; 220/3, 465, 414

[56] References Cited

U.S. PATENT DOCUMENTS

| | | | |
|---|---|---|---|
| 2,848,133 | 8/1958 | Ramberg | 220/3 |
| 3,047,191 | 7/1962 | Young | |
| 3,095,112 | 6/1963 | Weinstein et al. | 220/67 |
| 3,312,575 | 4/1967 | Corbin, Jr. | 220/3 X |
| 3,334,780 | 8/1967 | Vanleer et al. | 220/3 X |
| 3,508,677 | 4/1970 | Laibson et al. | 220/3 |
| 3,620,876 | 11/1971 | Guglielmo et al. | 428/900 X |
| 3,727,022 | 4/1973 | Hamilton | 156/272.4 X |
| 3,874,544 | 4/1975 | Harmon | 220/3 |
| 3,907,149 | 9/1975 | Harmon | 220/3 |
| 3,908,851 | 9/1975 | Jacobs | 220/414 X |
| 3,969,812 | 7/1976 | Beck | 220/3 X |
| 4,317,472 | 2/1982 | Zahid | 138/30 |
| 4,328,836 | 5/1982 | Petrie | 138/30 |
| 4,348,792 | 9/1982 | Zahid | 138/30 X |

Primary Examiner—Henry J. Recla
Assistant Examiner—Robert M. Petrik
Attorney, Agent, or Firm—Pearne, Gordon, McCoy & Granger

[57] ABSTRACT

A filament-wound vessel for containing corrosive and pressurized fluids is disclosed. The vessel comprises a thermoplastic resin inner liner having a cylindrical sidewall and integral oblate, ellipsoidal end sections, and axially aligned access openings at each end of the vessel. One of the openings has a relatively wide diameter compared to the other opening, and a tank fitting is mounted in the wide diameter opening. The tank fitting comprises a fiber-reinforced plastic female member having a cylindrical end projecting into the wide diameter opening of the inner liner and a cylindrical neck portion projecting from the opening. An annular boss is provided between the cylindrical end and the cylindrical neck and rests on an exteriorly facing annular portion of the end section. A sealing ribbon, which comprises a substantially uniform mixture of a thermoplastic material and ferromagnetic particles, seals the boss to the annular portion upon the application of electromagnetic energy. The sidewall of the vessel is provided with a circumferential winding, and the entire sidewall of the vessel is provided with a helical winding which extends over the end sections to provide further reinforcement for the annular bosses. A circumferential winding is provided around the neck section to ensure the dimensional stability of the neck section upon the application of internal pressure to the tank.

6 Claims, 3 Drawing Sheets

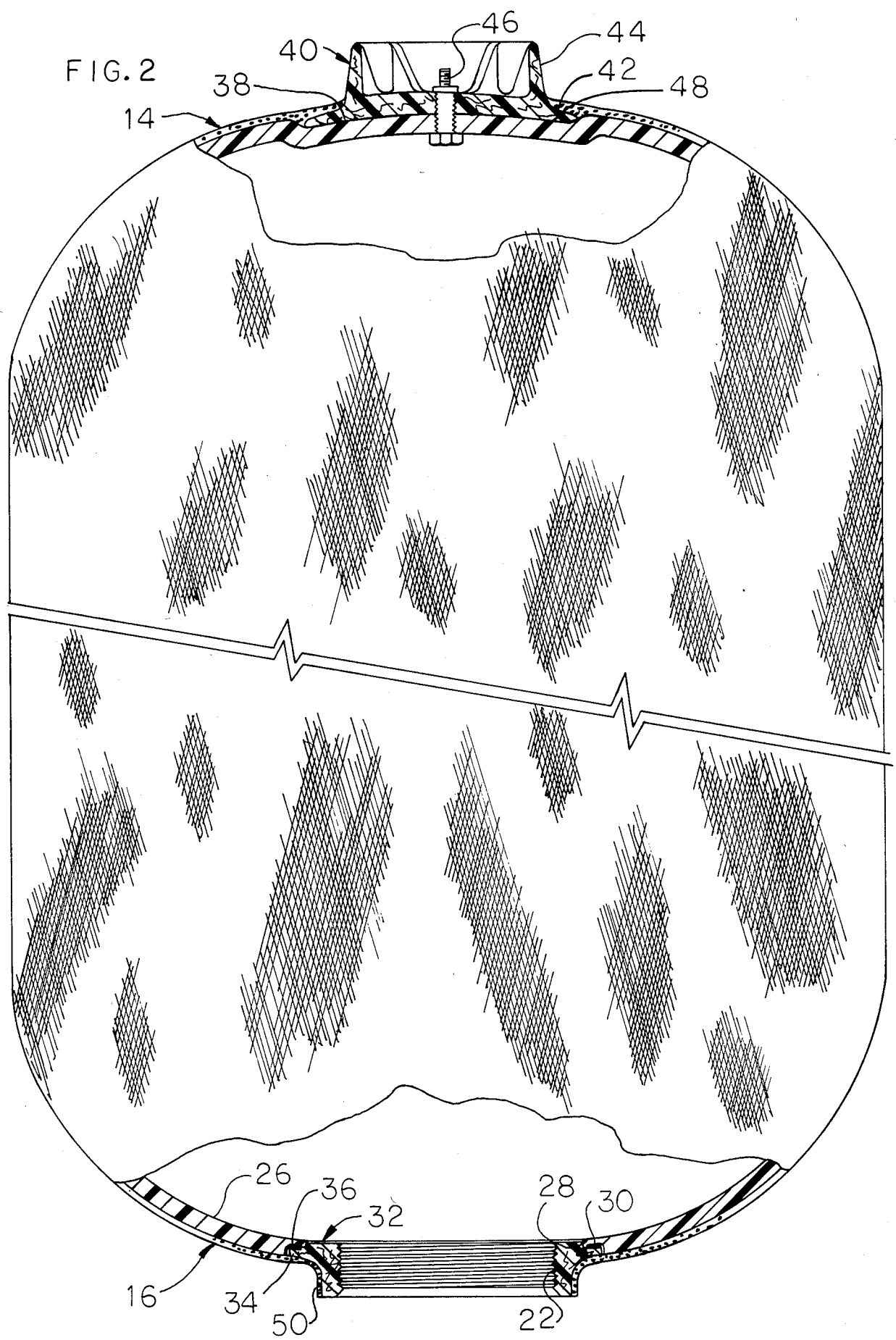

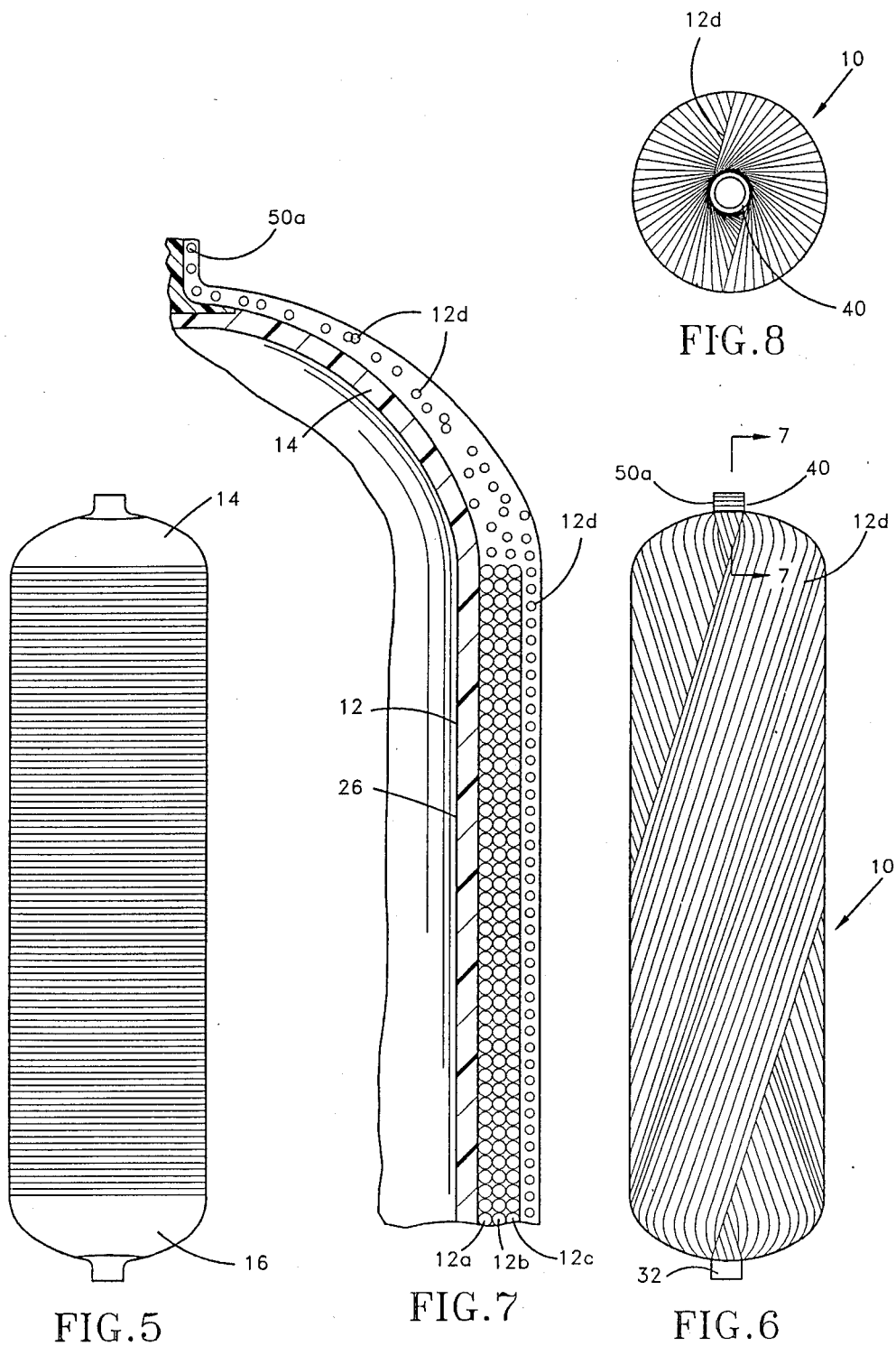

TANK FITTING FOR A FILAMENT-WOUND VESSEL

BACKGROUND OF THE INVENTION

This invention relates to filament-wound vessels and, more particularly, to an improved end fitting for a vessel which is adapted to contain corrosive and/or pressurized fluids.

A typical application for the invention is an accumulator or pressure control device for water systems dependent upon well water. Such a system includes a pipe extending into the underground water supply, a pump, and a reservoir tank which is connected to the service lines. Frequently, the tank is a metal container having no valve for pressurizing the tank with air and in which the air is merely trapped. In some installations, a valve, such as a regular tire valve, may be positioned at or near the top of the container and an outlet may be positioned near the bottom. A diaphragm may or may not be provided to separate the air from the water. A charge of air is introduced into the tank, usually occupying about one-half the volume of the tank and to a pressure sufficient to force water into the service lines connected thereto. A pressure switch senses the pressure within the tank or in the service line, as the case may be, and operates between limits, e.g., between 20 and 40 psi. If the pressure falls below 20 psi, the pump is activated and continues to operate until the pressure in the system is built up to 40 psi, when the pump is turned off by the pressure switch.

An acceptable prior art accumulator is set forth in U.S. Pat. No. 4,214,611, wherein the accumulator includes a pressure vessel having an inflatable bag therein which serves as a water-air separating diaphragm, with an inflating valve communicating with the interior of the bag and extending through one end of the tank. An inlet and outlet aperture is provided in the other end of the tank, and that aperture is in fluid communication with the water contained in the tank and the service system by means of a T-shaped fitting which is threaded into the aperture.

The tank or vessel disclosed in U.S. Pat. No. 4,214,611 is a unitary, seamless tank produced from glass fiber-reinforced resinous compositions which is produced in accordance with the process described in U.S. Pat. No. Re. 25,241 to Randolph, dated Sept. 11, 1962. The T-shaped fitting is an injection-molded fitting of conventional design. When the tank is pressurized, the threaded opening of the tank tends to enlarge radially relative to the neck of the threadedly received T-fitting. At the same time, the threaded neck of the T-fitting is urged axially outwardly by the pressure applied thereto. Furthermore, these pressure conditions are not static, but fluctuate as line pressure varies during water usage. Frequently, failure obtains by cracking of the tank around the opening or, more frequently, by stripping the threaded connection between the access opening and the T-fitting.

SUMMARY OF THE INVENTION

This invention relates to a filament-wound pressure vessel having an access opening into which a female threaded fitting is mounted. More particularly, the invention relates to a filament-wound pressure vessel having a blow-molded thermoplastic liner and a female fitting comprising a thermosetting, fiber-reinforced, injection-molded subassembly which is adapted to receive a tee or other service line fitting.

According to this invention, a blow-molded, thermoplastic resin inner liner is provided. The inner liner has a cylindrical sidewall, integral oblate, ellipsoidal end sections, and axially aligned access openings at each end of the liner. One of the openings has a relatively wide diameter compared to the other opening and a tank fitting is mounted in the wide diameter opening. The tank fitting is a fiber-reinforced, thermoset plastic female member which has a cylindrical end projecting into the wide diameter opening and a cylindrical neck projecting from the opening. The female fitting is internally threaded and has an annular boss between the cylindrical end and the cylindrical neck which rests on an exteriorly facing annular portion surrounding the wide opening. The boss is fused and sealed to the exteriorally facing annular portion of the liner by means of a thermoplastic material impregnated with ferromagnetic particles. Such a material is disclosed in U.S. Pat. Nos. 3,620,875 and 3,620,876. The thermoplastic material may be in the form of a flat annular ribbon or annulus which is placed between the annular boss and the end section. The assembly is then subjected to induction heating to fuse and bond the assembled parts together to provide a fluid and pressuretight seal. The assembly comprising the fitting and the blow-molded liner is then mounted in a filament winding machine and a ribbon or band of thermosetting resin-impregnated glass fibers is level-wound on the cylindrical portion of the liner. The thus-wound liner is then helically wound with a resin-impregnated glass ribbon or band, to provide reinforcement in the hoop and longitudinal directions of stress. At the end of the winding operation, the ribbon or band is wound a number of times around the cylindrical neck of the fitting to provide stability to the fitting under pressure conditions. Further dimensional stability is provided by the fibrous reinforcement of the fitting, which, together with the fiber windings, minimizes the tendency of the threaded I.D. of the fitting to expand under pressure. The thus-assembled tank is cured and a T-fitting is threaded into the end fitting. If desired, an O-ring or gasket may be provided between the boss and the liner to further ensure a fluid and pressuretight tank.

BRIEF DESCRIPTION OF THE DRAWINGS

FIG. 2 is an elevational view of a pressure vessel produced according to this invention, with portions broken away to show details of the assembly;

FIG. 5 is an elevational view of the vessel after the level winding operation; and FIG. 6 is an elevational view of a pressure vessel produced according to this invention showing the helical wrapping pattern of the reinforcement on the vessel;

FIG. 7 is an enlarged, fragmentary, cross-sectional view, the plane of the section being indicated by the line 7—7 in FIG. 6; and FIG. 8 is a plan view of the vessel illustrated in FIG. 6, showing the tangential relationship between the helical windings and the top end fitting.

DETAILED DESCRIPTION OF THE INVENTION

Figure 1:
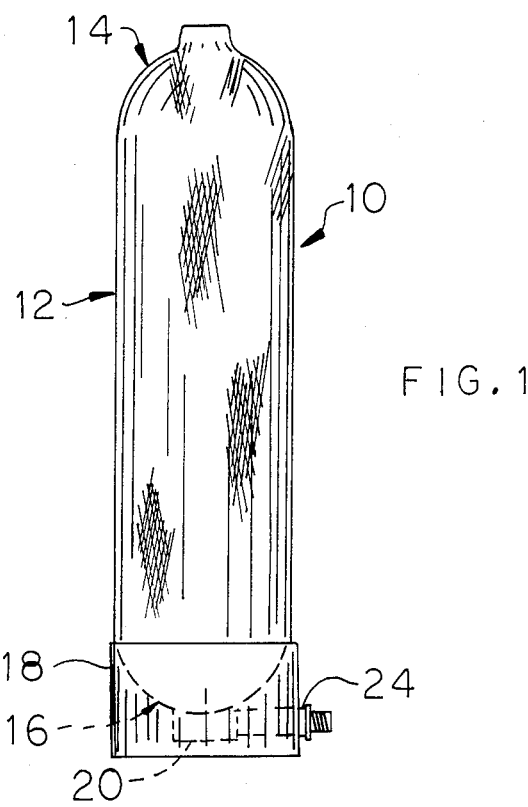
FIG. 1 is an elevational view of a filament-wound vessel produced in accordance with the teachings of this invention.

Referring now to the drawings, a vessel 10 for containing corrosive and/or pressurized fluids is illustrated. The vessel 10, as illustrated in FIG. 1, has a cylindrical sidewall 12 and integral, oblate, ellipsoidal end sections 14 and 16. The tank 10 is mounted on a foot structure 18 and is provided with a service line fitting 20 which is threaded into a threaded access opening 22 (e.g., FIG. 2) in the end section 16. The fitting 20 may be of the type set forth in U.S. Pat. No. 4,214,611 and is provided with a pipe fitting 24 which has a threaded end for communication with the home water system.

The pressure vessel 10 has a thermoplastic blow-molded liner 26 which is preferably formed from a high molecular weight polyethylene. The end section 16 is provided with an opening 28 and a surrounding annular recessed shoulder 30. A tank bottom fitting 32, which is provided with the threaded access opening 22, has an annular flange 34 which is seated on the annular shoulder 30. The fitting 32 is a fiber-reinforced, injection-molded, thermoplastic resin, and is preferably a high density polyethylene which is preferably 30% glass fiber-filled and injection-molded to the illustrated shape.

The fitting 32 is sealed within the opening 28 by placing a flat annular sealing ribbon 36 between the flange 34 and the shoulder 30. The ribbon 36 is preferably of the type set forth in U.S. Pat. Nos. 3,620,875 and 3,620,876, and comprises an electromagnetic, thermoplastic adhesive composition molded in the form of a flat gasket and having particulate electromagnetic particles dispersed therein. In the disclosed embodiment, the ribbon is 0.040 inch thick and comprises a high density polyethylene filled with ferrous iron particles. The flange 34, the shoulder 30, and the interposed ribbon 36 are subjected to an electromagnetic field of sufficient power and frequency to inductively heat the dispersed ferromagnetic particles to melt the ribbon 36 and the areas of the flange 34 and the shoulder 30 immediately adjacent the ribbon to form a bond having high structural integrity.

The liner 26 at the end section 14 of the tank is provided with a circular recess 38 within which a protective fitting 40 is mounted. The fitting 40 is a fiber-reinforced, injection-molded, thermoplastic resin. The fitting 40 has an annular lip 42 and a web-reinforced, axially extending cylindrical portion 44. The fitting 40 is a high density polyethylene which is preferably 30% glass fiber-filled and injection-molded to the illustrated shape. An air valve 46 similar to a standard tire valve is threaded through the fitting 40 and through the liner 26, and serves to carry and admit air to an inflatable bladder (not shown) but similar to the bladder described and illustrated in U.S. Pat. No. 4,214,611.

A flat annular ribbon 48 similar to the ribbon 30 is interposed between the annular shoulder 42 and the recess 38. The fitting 40 is fused to the liner 26 by subjecting the flange 42, the liner 38, and the interposed ribbon 48 to an electromagnetic field to melt adjacent thermoplastic sections and cause them to become intimately fused to provide a high strength structural joint. The cylindrical portion 44 protects the valve 46 against breakage and assists in the winding operation described below.

The cylindrical sidewall section 12 of the tank is then filament-wound with glass fiber filaments impregnated with an epoxy resin. Preferably, the cylindrical sidewall is wound in three circumferential or level-wound passes 12a, 12b, and 12c, as may be seen in FIGS. 5 and 6. Thereafter, the cylindrical section 12 and the end sections 14 and 16 are wound with one layer of a helical winding 12d over the entire liner 26, with the passes running tangential to the outside diameters of a cylindrical neck portion 50 of the fittings 40 and 32, as may be seen in FIG. 7. At the completion of the helical winding operation, the end of the winding strand is then wrapped around the cylindrical neck portion 50 of the fitting 32 to provide a circumferential reinforcement 50a for the threads 22 against radial expansion upon pressurization of the vessel during service.

Figure 3:
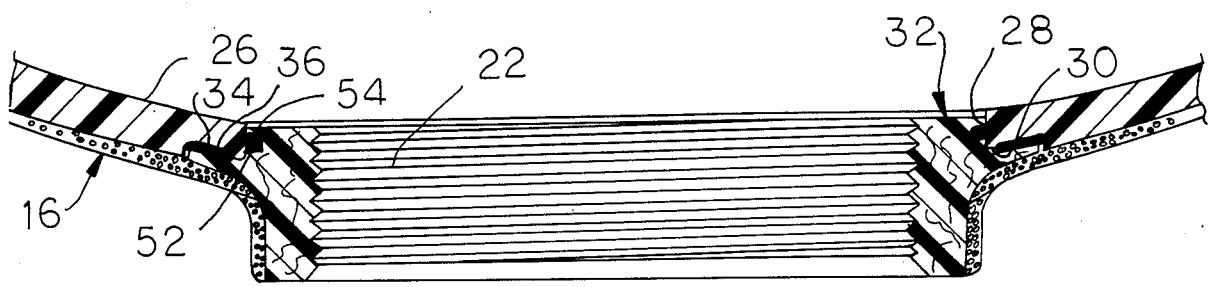
FIG. 3 is a fragmentary, cross-sectional view of the connection between the tank fitting and the liner according to one aspect of this invention.
Figure 4:
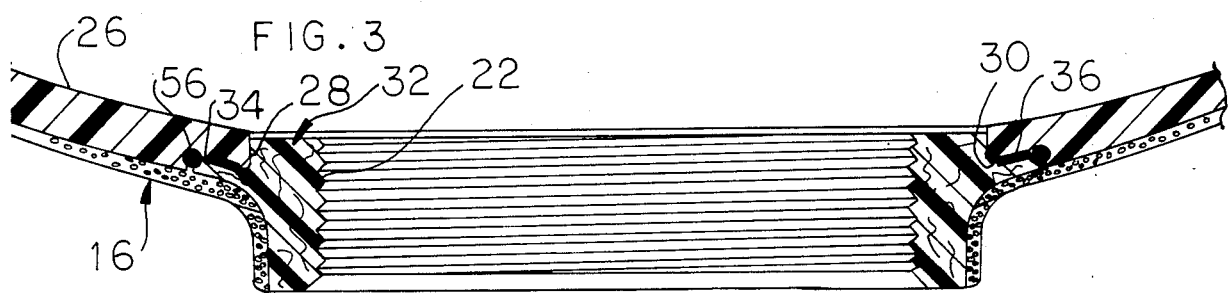
FIG. 4 is a fragmentary, cross-sectional view of the connection between the tank fitting and the liner according to a further aspect of this invention.

FIGS. 3 and 4 illustrate further aspects of the invention. In FIG. 3, an O-ring seal 52 is received within a circumferential groove 54 in the fitting 32 between the ribbon 36 and the interior of the tank 10 to further ensure a pressure and liquidtight seal between the fitting 32 and the liner 26 and to prevent corrosive seepage along the interface between the liner and the fitting to the fused joint around the ribbon 36, which would tend to degrade that seal.

In FIG. 4, an O-ring 56 may be provided between the liner 26 and the fitting 32 at an interfacial location between the ribbon 36 and the exterior of the tank if the contained fluid is not of a corrosive nature.

The glass reinforcement in the fittings is provided eliminate the thread creep or radial expansion which causes tank failure in the thread area or various unsupported or unreinforced areas such as the area of the liner adjacent the fitting 40, which cannot be reinforced with the helical winding. Static tests of vessels produced in accordance with the present invention, at approximately 1.33 times the actual operating pressure at a temperature of 120° F. at 100% relative humidity, show no signs of creep at 1,212 hours. As a comparison, identically produced vessels having non-fiber-reinforced fittings have failed at 380, 463, and 560 hours. In all failures, the thread areas had lineal or axial distortion of the threads and areas of actual material flow.

Although the preferred embodiment of this invention has been shown and described, it should be understood that various modifications and rearrangements of the parts may be resorted to without departing from the scope of the invention as disclosed and claimed herein.

What is claimed is:

1. A filament-wound vessel for containing corrosive and pressurized fluids, comprising a thermoplastic resin inner liner having a cylindrical sidewall and integral, oblate, ellipsoidal end sections, axially aligned access openings at each end of said vessel, one of said openings having a relatively wide diameter compared to the other opening, a tank fitting comprising a fiber-reinforced plastic female member mounted in the wide diameter opening, said tank fitting having a cylindrical end projecting into said wide diameter opening, and a cylindrical neck projecting from said opening, a cylindrical threaded opening through said tank fitting, an annular boss between said cylindrical end and said cylindrical neck and resting on an exteriorly facing annular portion surrounding said wide diameter opening, means fusing and sealing said boss to said exteriorly facing annular portion, said sealing means comprising a substantially uniform mixture of thermoplastic material and ferromagnetic particles, a resin-impregnated, cylindrical fibrous winding covering the axial extent of the cylindrical sidewall, and a resin-impregnated, helical fibrous winding covering the axial extent of the cylindrical sidewall and the end sections, each wrap of said helical winding over said end sections being substantially tangential and covering said annular boss, said helical winding further being wrapped around said neck.

2. A vessel according to claim 1, wherein additional sealing means is provided between said boss and said exteriorly facing annular portion.

3. A vessel according to claim 2, wherein said additional sealing means comprises an O-ring.

4. A vessel according to claim 3, wherein said O-ring is interposed between said fusing means and the interior of the tank.

5. A vessel according to claim 3, wherein said O-ring is interposed between said fusing means and the exterior of said tank.

6. A vessel according to claim 1, including a circular recess in said inner liner surrounding said small diameter opening, a protective fitting comprising a fiber-reinforced plastic member having a flanged base sealed within said circular recess and an axially projecting cylindrical portion, an axially located valve extending through said base and said liner, said helical winding being substantially tangential to said cylindrical portion.

* * * * *